US008817590B2

(12) United States Patent
Tee et al.

(10) Patent No.: US 8,817,590 B2
(45) Date of Patent: Aug. 26, 2014

(54) PROCESSING INFORMATION BLOCKS FOR WIRELESS TRANSMISSION

(75) Inventors: Lai-King Tee, San Diego, CA (US); Yi Song, Plano, TX (US); Neng Wang, Plano, TX (US); Chuandong Li, Nepean (CA)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 13/125,997

(22) PCT Filed: Nov. 4, 2009

(86) PCT No.: PCT/US2009/063267
§ 371 (c)(1),
(2), (4) Date: Apr. 26, 2011

(87) PCT Pub. No.: WO2010/053985
PCT Pub. Date: May 14, 2010

(65) Prior Publication Data
US 2011/0199982 A1    Aug. 18, 2011

Related U.S. Application Data

(60) Provisional application No. 61/111,036, filed on Nov. 4, 2008.

(51) Int. Cl.
H04J 11/00    (2006.01)
H04L 12/26    (2006.01)
H04W 4/00    (2009.01)
H04B 1/00    (2006.01)

(52) U.S. Cl.
USPC ........... 370/208; 370/238; 370/328; 370/334; 370/344; 375/146

(58) Field of Classification Search
None
See application file for complete search history.

(56) References Cited

U.S. PATENT DOCUMENTS 7,782,896 B2    8/2010    Kuri et al.
8,068,427 B2 *  11/2011   Gholmieh et al. ............ 370/236
(Continued)

FOREIGN PATENT DOCUMENTS

EP    1903737 A1    3/2008
WO    2008/075890   6/2008

OTHER PUBLICATIONS

International Search Report and Written Opinion dated May 28, 2010 for International Application No. PCT/US2009/063267, International Filing Date: Nov. 4, 2009 consisting of 12-pages.

(Continued)

*Primary Examiner* — Melanie Jagannathan
(74) *Attorney, Agent, or Firm* — Meyertons, Hood, Kivlin, Kowert & Goetzel, P.C.

(57) ABSTRACT

In general, according to an embodiment, a wireless transmitter includes a plurality of coding and modulation modules to apply corresponding coding and modulation algorithms to input information blocks. A discrete Fourier transform (DFT) precoder applies DFT processing to outputs of the coding and modulation modules, and an inverse fast Fourier transform (IFFT) module receives a DFT output of the DFT precoder, which is mapped to different subcarriers according to the resource allocation indicated by the base station, and applies IFFT processing to the DFT output. An output processing stage produces output signals based on the output of the IFFT module to transmit wirelessly to a wireless receiver. In a different implementation, the outputs of the coding and modulation modules can be provided to an IFFT module to produce IFFT-processed output information.

19 Claims, 3 Drawing Sheets

(56) References Cited

U.S. PATENT DOCUMENTS

| | | |
|---|---|---|
| 8,385,933 B2 | 2/2013 | Kishigami et al. |
| 2005/0058217 A1 | 3/2005 | Sandhu et al. |
| 2006/0203785 A1* | 9/2006 | Kim .............................. 370/338 |
| 2007/0104149 A1* | 5/2007 | Khan et al. .................... 370/334 |
| 2007/0183386 A1* | 8/2007 | Muharemovic et al. ...... 370/344 |
| 2007/0183516 A1 | 8/2007 | Monogioudis et al. |
| 2007/0189235 A1* | 8/2007 | Chandra et al. ............... 370/335 |
| 2007/0218942 A1* | 9/2007 | Khan et al. ................. 455/553.1 |
| 2008/0101214 A1 | 5/2008 | Jitsukawa et al. |
| 2008/0232449 A1* | 9/2008 | Khan et al. .................... 375/220 |
| 2009/0080500 A1* | 3/2009 | Muharemovic et al. ...... 375/146 |
| 2010/0103901 A1 | 4/2010 | Miki et al. |

OTHER PUBLICATIONS

Motorola, "Uplink Multiple Access for EUTRA;" R1-050245, 3GPP TSG RAN1#40bis Meeting, Beijing, China, Apr. 4-8, 2005, pp. 1-11.

Panasonic, "Consideration on Multicarrier Transmission scheme for LTE-Adv uplink;" R1-082398, 3GPP TSG RAN WG1 Meeting #53bis, Warsaw, Poland, Jun. 30-Jul. 4, 2008, pp. 1-3.

Office action and translation thereof for corresponding Japanese Patent Application No. 2011-534901, Jul. 31, 2013, pp. 1-6.

* cited by examiner

PROCESSING INFORMATION BLOCKS FOR WIRELESS TRANSMISSION

CROSS-REFERENCE TO RELATED APPLICATIONS

This application is a Submission Under 35 U.S.C. §371 for U.S. National Stage Patent Application of International Application Number: PCT/US2009/063267, filed Nov. 4, 2009 entitled "PROCESSING INFORMATION BLOCKS FOR WIRELESS TRANSMISSION," which claims priority to U.S. Provisional Application Ser. No. 61/111,036, filed Nov. 4, 2008, the entirety of both which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) (also referred to as EUTRA (Evolved Universal Terrestrial Radio Access)) standard from 3GPP, which seeks to enhance the UMTS technology.

An issue associated with uplink wireless transmissions is power consumption associated with processing of information to be transmitted on the uplink. It is desired to achieve a low peak-to-average-power ratio (PAPR) to improve power efficient performance. However, in some implementations, achieving the desired power efficient performance may require use of relatively expensive power amplifiers in transmitters of mobile stations due to large power amplifier backoff requirements. Power amplifier backoff refers to operating the power amplifier at an output power level that is lower than the peak power level. A large power amplifier backoff (lower average power level relative to the peak power level) reduces the efficiency of the power amplifier.

Other goals associated with wireless transmission is wider bandwidth, higher spectral efficiency, and higher-order MIMO (multiple input, multiple output). MIMO refers to wireless transmission in which the transmitter has multiple antennas and the receiver has multiple antennas, where multiple input means multiple transmitted signals into the channel, whereas multiple output means multiple signals at the output of the channel. Conventional wireless transmitters may not provide desired characteristics in an efficient manner.

SUMMARY

In general, according to an embodiment, a wireless transmitter includes a plurality of coding and modulation modules to apply corresponding coding and modulation algorithms to input information blocks. A discrete Fourier transform (DFT) precoder applies DFT processing to outputs of the coding and modulation modules. An inverse fast Fourier transform (IFFT) module receives a DFT output of the DFT precoder and applies IFFT processing to the DFT output. An output processing stage produces output signals based on an output of the IFFT module to transmit wirelessly to a wireless receiver.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

In general, according to an embodiment, a more efficient technique or mechanism is provided for processing information blocks for wireless transmission over a wireless link between a wireless transmitter and a wireless receiver. The technique or mechanism uses a wireless transmitter that has multiple coding and modulation modules to apply corresponding coding and modulation algorithms to input information blocks. The modulation and coding algorithms can be different to allow for link adaptation for subcarriers in different parts of a wireless transmission bandwidth between the wireless transmitter and wireless receiver. The wireless transmission bandwidth can include a number of subcarriers associated with corresponding different frequencies.

The wireless transmitter includes a discrete Fourier transform (DFT) precoder that applies DFT processing to outputs of the coding and modulation modules. Note that one DFT precoder (rather than multiple DFT precoders) is used to process the outputs of the multiple coding and modulation modules. The use of just one DFT precoder to process outputs of multiple coding and modulation modules allows for a more efficient implementation.

An inverse fast Fourier transform (IFFT) module receives a DFT output of the DFT precoder and applies IFFT processing to the DFT output. An output processing stage then produces output signals based on an output of the IFFT module for transmission wirelessly to a wireless receiver.

In accordance with some embodiments, the DFT output of the DFT precoder is mapped to an input of the IFFT module as clusters of contiguous subcarriers (having respective different frequencies). The clustering of subcarriers allows for improvement in the PAPR (peak-to-average-power ratio). Also, such an embodiment provides for an improved cubic metric (CM), which is the metric used to estimate the reduction in power capability of a power amplifier in a wireless transmitter.

In accordance with some embodiments, the information block processing is applied to uplink wireless transmission (from a mobile station to a base station). However, even though reference is made to application of the information block processing in the uplink direction, note that in other embodiments, the information block processing can be applied in the downlink direction as well.

As used here, an "information block" refers to a collection of information bits, which can represent traffic data or control signaling. A "mobile station" refers to a terminal accessible by a user and that is able to move from location to location. A "base station" is a wireless access network entity that is responsible for wireless communications with a mobile station. A base station can include a base transceiver station (BTS) and a base station controller or radio network controller, for example.

Figure 1:
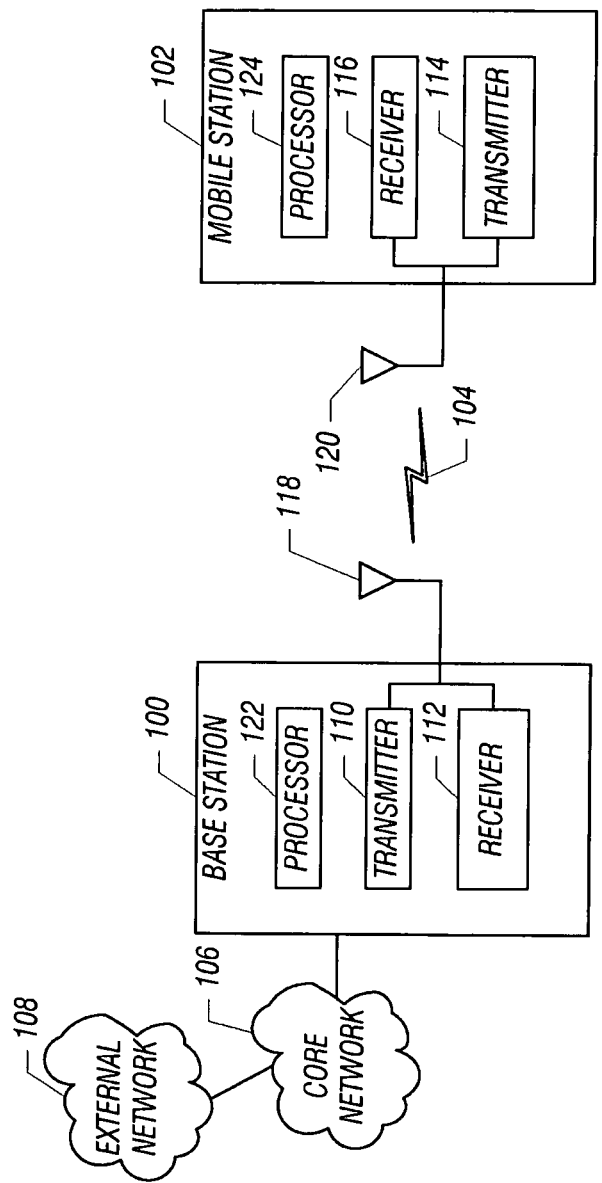
FIG. 1 is a block diagram of an example communications network that incorporates an embodiment of the invention.

FIG. 1 illustrates a communications network that includes a base station 100 that is able to communicate with a mobile station 102 over a wireless link 104. The base station 100 and mobile station 102 are each considered a wireless communications device. The base station 100 is part of a wireless access network, which can include many base stations to provide coverage for respective coverage areas (cells). Each base station 100 can communicate with multiple mobile stations within the coverage area of the base station.

The base station 100 is in turn connected to a core network 106 associated with the wireless access network. The core network 106 includes nodes, such as gateway nodes, to interface the wireless access network to an external network 108, which can be an external data network (e.g., Internet).

The core network 106 and wireless access network including the base stations 100 can operate according to one of various different technologies, including as examples: GSM (Global System for Mobile communications) or UMTS (Universal Mobile Telecommunications System) technology, defined by the Third Generation Partnership Project (3GPP); CDMA 2000 (Code Division Multiple Access 2000) technology, defined by 3GPP2; Long Term Evolution (LTE) technology or EUTRA (Evolved Universal Terrestrial Radio Access) from 3GPP, which is an enhancement of the UMTS technology; WiMax (Worldwide Interoperability for Microwave Access) technology, as defined by IEEE (Institute of Electrical and Electronics Engineers) 802.16 standards; and other technologies.

The base station 100 includes a transmitter 110 and a receiver 112, and the mobile station 102 includes a transmitter 114 and receiver 116. The transmitter 110 in the base station 100 is used to transmit downlink information through an antenna assembly 118 of the base station 100 over the wireless link 104. The downlink information is received by the receiver 116 of the mobile station 102 through an antenna assembly 120 of the mobile station 102.

In the other direction, uplink information is transmitted by the transmitter 114 in the mobile station 102 through the mobile station antenna assembly 120 over the wireless link 104. The uplink information is received by the receiver 112 in the base station 100 through the base station antenna assembly 118.

The base station 100 further includes a processor 122, and the mobile station 102 includes a processor 124. The processors 122 and 124 control respective tasks performed by the base station 100 and mobile station 102, respectively, including transmission and reception of information over the wireless link 104. For example, a processor can provide information (traffic data or control signaling) to a respective transmitter for transmission over the wireless link 104. The processor can also process received data that has been received by the corresponding receiver over the wireless link 104.

Figure 2:
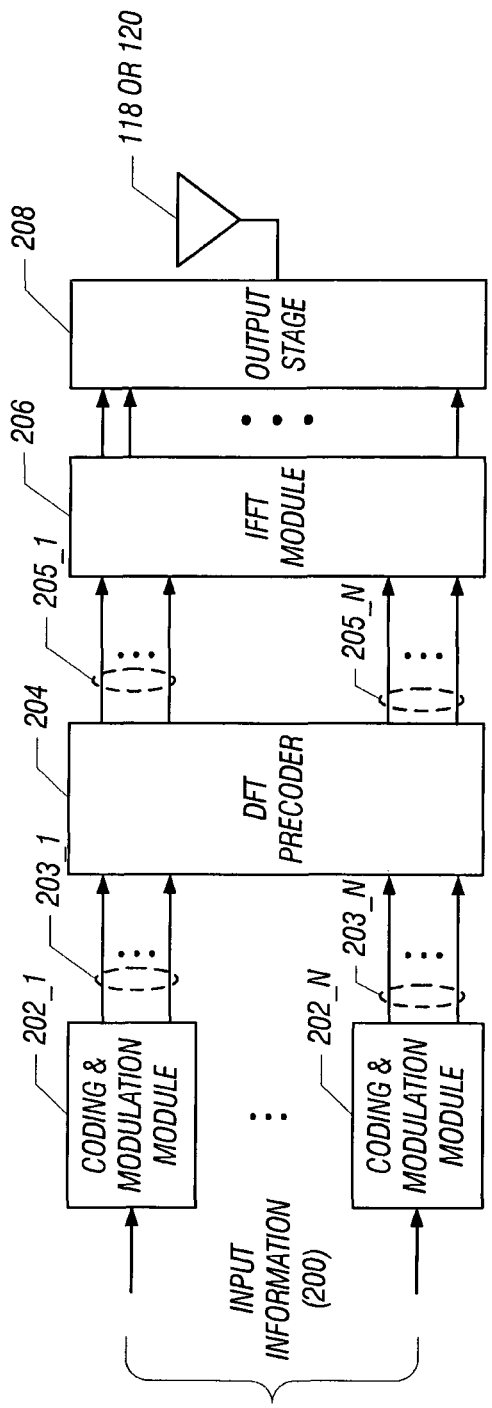
FIG. 2 is a block diagram of a wireless transmitter according to an embodiment.

FIG. 2 illustrates components of a transmitter (e.g., 110 or 114 in FIG. 1), according to an embodiment. The transmitter includes multiple coding and modulation modules 202_1 to 202_N that receives input information 200 (in the form of input information blocks). The output of each coding and modulation module includes a group of coded and modulated symbols, represented as 203_$i$, where i=1–N. The group of coded and modulated symbols 203_$i$ is output from a corresponding coding and modulation module 202_$i$. Each group of coded and modulated symbols 203_$i$ is provided to a corresponding different part of a DFT precoder 204, where each corresponding part of the DFT precoder 204 applies DFT processing on the respective group of coded and modulated symbols 203_$i$. A single DFT precoder provides for improved (reduced) peak to average power ratio of the transmit signal at the IFFT output, as compared to the case when multiple DFT precoders are used, where the DFT spreading is across a bandwidth equivalent to the number of modulation symbols for the individual code block. In the case of a single DFT precoder, all the modulation symbols in the time-domain are spread across a bandwidth that is equivalent to the total allocated bandwidth for the mobile station in the uplink, which is more effective in reducing the peak to average power ratio.

The DFT precoder 204 outputs multiple clusters 205_1 through 205_N of subcarriers. Each cluster 205_$i$ of subcarriers contains a DFT-processed version of the corresponding input group of coded and modulated symbols 203_$i$. The arrangement used in FIG. 2 allows for the DFT output to be mapped to the IFFT input (of an IFFT module 206) as clusters of contiguous subcarriers; this clustering of subcarriers allows for improvement in PAPR and CM characteristics.

The IFFT module 206 applies inverse fast Fourier transform processing on respective input clusters 205_1 to 205_$n$. The mapping of the clusters to the input of the IFFT module 206 is based on the resource allocation corresponding to the mobile station's transmission. Basically, different parts of the IFFT module 206 are used to process corresponding clusters 205_1 to 205_N. The IFFT-processed information is then output to an output processing stage 208, which performs various processing including parallel to serial conversion, cyclic prefix insertion, windowing, carrier modulation, filtering, frequency up-conversion and power amplification to output analog RF signals that are to be wirelessly transmitted by the antenna assembly 118 (in the downlink direction) or 120 (in the uplink direction).

The wireless transmitter arrangement shown in FIG. 2 is considered a clustered DFTS-FDMA (discrete Fourier transform spread-frequency division multiple access) arrangement.

Figure 3:
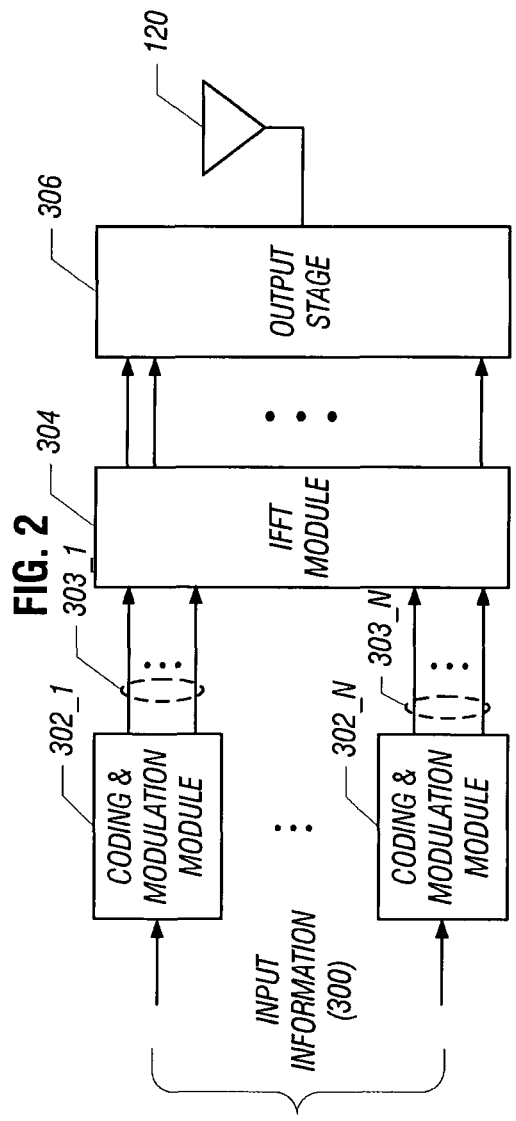
FIG. 3 is a block diagram of a wireless transmitter according to another embodiment.

In an alternative embodiment, for uplink wireless transmission, a transmitter (e.g., 120 in FIG. 1) containing components of FIG. 3 can be employed. Input information 300 (in the form of input information blocks) is provided to corresponding coding and modulation modules 302_1 to 302_N, which can apply different coding and modulation algorithms to respective input information blocks. The output of each coding and modulation module 302_$i$ is a corresponding group 303_$i$ of symbols that are provided to an IFFT module 304. After applying IFFT processing, the output of the IFFT module 304 is provided to an output processing stage 306, which performs processing to produce signals for uplink transmission by the antenna assembly 120.

The arrangement shown in FIG. 3 is an OFDMA (orthogonal frequency division multiple access) arrangement that provides more flexible uplink multiple access with lower complexity as compared to the transmitter depicted in FIG. 2. Specifically, using OFDMA, the DFT precoder 204 does not have to be used. OFDMA provides a relatively large number of closely-spaced orthogonal subcarriers (of different frequencies) for carrying information. OFDMA also defines time slots (along a time dimension). By providing multiplexing in both the time dimension and frequency dimension, subbands can be provided, where each subband includes a number of subcarriers along the frequency dimension and time slots along the time dimension.

Figure 4:
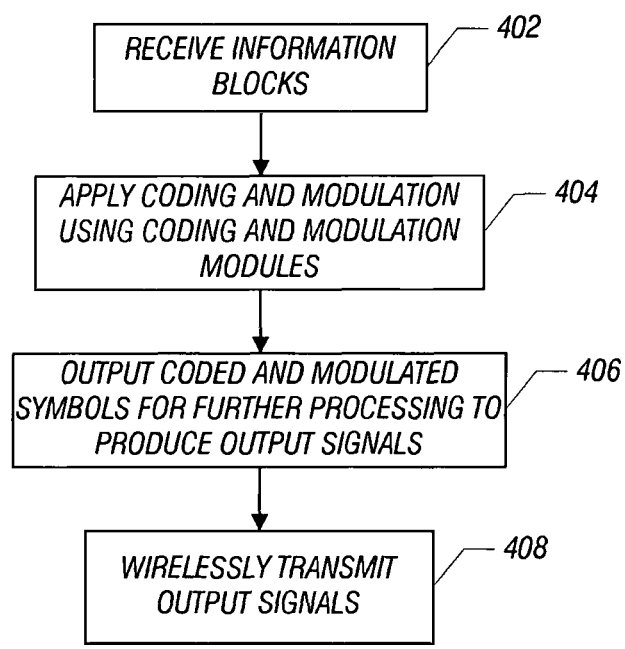
FIG. 4 is a flow diagram of a process of processing information blocks for wireless transmission, according to an embodiment.

FIG. 4 is a flow diagram of a process of processing input information blocks according to an embodiment. The processing is performed by components of a transmitter. Input information blocks are received (at 402). The received information blocks can include traffic data or control signaling. By applying different coding and modulation algorithms to different information blocks, link adaptation can be performed for different parts of the transmission spectrum to improve communications reliability and spectral efficiency. For example, certain parts of the transmission spectrum may be associated with poor channel conditions, such that a more robust coding and modulation algorithm should be applied to improve reliability and performance.

Selection of coding and modulation to be applied can be based on scheduling performed at the base station using feedback information from the mobile station, where the feedback information includes CQI (channel quality indicator) and/or PMI (precoding matrix index). PMI refers to an index (or other type of indicator) to enable selection of a precoding vector to be applied to wireless transmissions. CQI is an indication of wireless channel quality between the base station and the mobile station. Different values of PMI select different codewords or precoding matrix. Based on the feedback information provided from the mobile station to the base station, the base station can schedule the mobile station to apply selected coding and modulation algorithms to respective information blocks at the coding and modulation modules (202_1 to 202_N or 302_1 to 302_N). The scheduling by the base station is accomplished by the base station sending control messages containing indications of coding and modulation algorithms to apply by the respective coding and modulation modules. Coding here may include channel coding, e.g., convolutional or turbo encoding, interleaving and rate matching stages, as in the case of LTE.

Next, the coded and modulated symbols are output (at 406) by the coding and modulation modules (202_1 to 202_N or 302_1 to 302_N) for further processing to produce output signals. The further processing can include processing by a DFT precoder 204, the IFFT module 206, and output processing stage 208 (FIG. 2), or by the IFFT module 304 and output processing stage 306 (FIG. 3).

The output signals are then wirelessly transmitted (at 408) by an antenna, such as antenna 118 or 120 in FIG. 1.

The various modules depicted in FIG. 2 and FIG. 3 can be implemented with hardware only, or implemented with a combination of hardware and software. Thus, the coding and modulation module can be implemented with hardware only or hardware and software, the DFT precoder can be implemented with hardware only or hardware and software, and the IFFT module can be implemented with hardware only or hardware and software.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A wireless transmitter comprising:
   a plurality of coding and modulation modules configured to generate a plurality of modulated outputs, wherein to generate the plurality of modulated outputs, each coding and modulation module is configured to apply a respective coding and modulation algorithm to a respective corresponding input information block of a plurality of input information blocks;
   a discrete Fourier transform (DFT) precoder configured to generate a plurality of DFT outputs, wherein to generate the plurality of DFT outputs, the DFT precoder is configured to apply DFT processing to each respective modulated output of the plurality of modulated outputs;
   an inverse fast Fourier transform (IFFT) module configured to receive the plurality of DFT outputs, and generate a plurality of IFFT outputs, wherein each IFFT output of the plurality of IFFT outputs corresponds to a respective coding and modulation algorithm and is mapped onto a different respective portion of a wireless spectrum, wherein to generate the plurality of IFFT outputs, the IFFT module is configured to apply IFFT processing to each respective DFT output of the plurality of DFT outputs; and
   an output processing stage to produce output signals based on an output of the IFFT module to transmit wirelessly to a wireless receiver.

2. The wireless transmitter of claim 1, wherein each respective DFT output is mapped to a corresponding input of the IFFT module as a cluster of contiguous subcarriers.

3. The wireless transmitter of claim 1, wherein the respective coding and modulation algorithms applied by the plurality of coding and modulation modules enable link adaptation for subcarriers in the different respective portions of the wireless transmission spectrum.

4. The wireless transmitter of claim 1, wherein at least two of the respective coding and modulation algorithms are different.

5. The wireless transmitter of claim 1, wherein the respective coding and modulation algorithms applied by the plurality of coding and modulation modules are scheduled by a base station.

6. The wireless transmitter of claim 5, wherein the respective coding and modulation algorithms applied by the plurality of coding and modulation modules are based on control indications received from the base station at a mobile station containing the wireless transmitter.

7. A mobile station comprising:
   a wireless transmitter for wirelessly sending signals to a wireless receiver, wherein the wireless transmitter includes:
      a plurality of coding and modulation modules configured to apply respective coding and modulation algorithms to respective input information blocks, and provide resulting respective modulated outputs;
      an inverse fast Fourier transform (IFFT) module configured to receive the respective modulated outputs and produce corresponding IFFT-processed output information based on the respective modulated outputs, wherein the corresponding IFFT-processed output information comprises different respective portions, wherein each different respective portion corresponds to a different respective coding and modulation algorithm, and maps onto a different respective portion of a wireless spectrum; and
      an output processing stage to produce output signals for wireless transmission based on the corresponding IFFT-processed output information.

8. The mobile station of claim 7, further comprising a processor to produce information to be transmitted by the wireless transmitter.

9. The mobile station of claim 7, wherein selection of coding and modulation algorithms to apply is based on control information from a base station.

10. The mobile station of claim 9, wherein the control information from the base station is based on an estimate of uplink channel quality.

11. The mobile station of claim 7, wherein an arrangement including the plurality of coding and modulation modules and the IFFT module provides OFDMA (orthogonal frequency division multiple access) communications.

12. The mobile station of claim 7, wherein the mobile station is configured to communicate wirelessly according to an Evolved Universal Terrestrial Radio Access (EUTRA) standard.

13. A method of wirelessly transmitting information blocks, comprising:
   generating, by a wireless transmitter, coded and modulated information, comprising applying respective coding and modulation algorithms by corresponding respective coding and modulation modules to corresponding respective information blocks;
   providing the coded and modulated information to a discrete Fourier transform (DFT) precoder in the wireless transmitter;
   generating a plurality of DFT outputs, comprising applying, by the DFT precoder, DFT processing to the coded and modulated information;
   generating a plurality of IFFT outputs, comprising applying, by an inverse fast Fourier transform (IFFT) module in the wireless transmitter, IFFT processing to the plurality of DFT outputs, wherein each IFFT output of the plurality of IFFT outputs corresponds to a respective coding and modulation algorithm and is mapped onto a different respective portion of a wireless spectrum; and
   producing output signals based on the plurality of IFFT outputs for transmission wirelessly to a wireless receiver.

14. The method of claim 13, wherein the plurality of DFT outputs are mapped to corresponding inputs of the IFFT module as clusters of contiguous subcarriers having corresponding different frequencies.

15. The method of claim 13, wherein at least two of the coding and modulation algorithms are different.

16. The method of claim 13, wherein wireless communication by the wireless transmitter is according to an Evolved Universal Terrestrial Radio Access (EUTRA) standard.

17. A method of wirelessly transmitting information blocks, comprising:
   generating respective modulated outputs, comprising applying respective coding and modulation algorithms by respective coding and modulation modules of a wireless transmitter to respective information blocks, wherein the wireless transmitter is part of a mobile station;
   receiving the respective modulated outputs from the coding and modulation modules at an inverse fast Fourier transform (IFFT) module;
   producing by the IFFT module, corresponding IFFT-processed output information based on the respective modulated outputs, wherein the corresponding IFFT-processed output information comprises different respective portions, wherein each different respective portion corresponds to a different respective coding and modulation algorithm, and maps onto a different respective portion of a wireless spectrum; and
   producing output signals for wireless transmission in an uplink direction based on the corresponding IFFT-processed output information.

18. The method of claim 17, further comprising:
   receiving downlink control information from a base station, wherein selection of coding and modulation algorithms to apply by the coding and modulation modules is based on the control information.

19. The method of claim 18, wherein the control information is based on feedback from the mobile station to the base station.

* * * * *